US011496826B2

United States Patent
Curtis et al.

(10) Patent No.: US 11,496,826 B2
(45) Date of Patent: Nov. 8, 2022

(54) HOST DETECTION AND ACOUSTIC MODULE DETECTION

(71) Applicant: Bose Corporation, Framingham, MA (US)

(72) Inventors: Craig Curtis, Chestnut Hill, MA (US); An Tran, Austin, TX (US); Bennett Alexander Nadeau, Austin, TX (US); Matthew James Storey, Austin, TX (US); Du Lo, Austin, TX (US)

(73) Assignee: Bose Corporation, Framingham, MA (US)

(*) Notice: Subject to any disclaimer, the term of this patent is extended or adjusted under 35 U.S.C. 154(b) by 0 days.

(21) Appl. No.: 16/875,475

(22) Filed: May 15, 2020

(65) Prior Publication Data

US 2021/0360342 A1 Nov. 18, 2021

(51) Int. Cl.
*H04R 1/10* (2006.01)
*G01H 3/10* (2006.01)

(52) U.S. Cl.
CPC .............. *H04R 1/1041* (2013.01); *G01H 3/10* (2013.01); *H04R 2420/07* (2013.01)

(58) Field of Classification Search
CPC . H04L 65/4084; H04L 65/602; H04L 67/306; H04L 1/02; H04L 47/801;
(Continued)

(56) References Cited

U.S. PATENT DOCUMENTS 7,806,525 B2 * 10/2010 Howell .................. G02C 11/10
351/158

8,841,612 B2 * 9/2014 Fukuda ................ H01J 37/263
250/306
(Continued)

FOREIGN PATENT DOCUMENTS

| CN | 104793352 A | 7/2015 |
|---|---|---|
| EP | 1916561 A2 | 4/2008 |
| KR | 102033767 | 10/2019 |

OTHER PUBLICATIONS

Danube Datasheet Version 1.0. Datasheet [online]. USound, Jan. 16, 2019 [retrieved on Apr. 30, 2020]. Retrieved from the Internet: <URL: https://www.usound.com/wp-content/uploads/2019/01/UAM-P-10L1010R10-Danube-Audio-Module-Datasheet.pdf>.
(Continued)

*Primary Examiner* — Lun-See Lao
(74) *Attorney, Agent, or Firm* — Bond, Schoeneck & King, PLLC

(57) ABSTRACT

An audio system and methods for detecting proximity between or engagement between a removable open-ear acoustic module and a host device. Upon detection of proximity or engagement, the audio system may adjust at least one device setting of the devices in the system. In some examples, the devices of the audio system are capable of obtaining specific identifying information about the other devices, and can be configured to adjust the at least one device setting based on device identity. For example, adjusting the device settings can include an adjustment to power state of the open-ear acoustic module, an audio equalization (EQ) setting, a volume setting, a bass level setting, a treble level setting, an Active Noise Reduction (ANR) setting, a user profile setting, selection of an algorithm of a plurality of algorithms related to data collection, a sensor calibration setting, and a user interface control setting.

19 Claims, 9 Drawing Sheets

(58) Field of Classification Search
CPC .............. H04L 65/1089; H04L 65/4076; H04L 65/601; H04L 67/12; H04L 67/325; H04M 2250/12; H04M 3/5116; H04M 1/6033; H04M 1/6058; H04M 1/72409; H04R 1/1091; H04R 1/08; H04R 1/1033; H04R 1/1041; H04R 2400/01; H04R 2420/07; H04R 3/04; H04R 1/028; H04R 1/105; H04R 1/1083; H04R 2410/05; H04R 2460/01; H04R 25/00; H04R 25/453; H04W 84/18; H04W 88/02; H04B 11/00; H04H 2201/19; H04H 2201/20; H04H 60/06; H04H 60/12; H04H 60/33; H04H 60/35; H04H 60/45; H04H 60/46; H04H 60/61; H04N 13/332; H04N 21/42201; H04N 21/4415; H04N 21/44218; H04N 5/232; H04N 5/23206; H04N 5/23216; H04N 5/232935
USPC .................. 381/74, 308, 312, 330, 322, 328
See application file for complete search history.

(56) References Cited

U.S. PATENT DOCUMENTS

| | | | |
|---|---|---|---|
| 9,113,259 B2* | 8/2015 | Pan | ......................... H04S 3/004 |
| 9,672,210 B2 | 6/2017 | Osterhout | |
| 10,250,965 B2 | 4/2019 | Bullen et al. | |
| 10,433,044 B2* | 10/2019 | Pong | ..................... H04R 1/1058 |
| 10,516,929 B2 | 12/2019 | Maguire et al. | |
| 2013/0250232 A1 | 9/2013 | Belbey et al. | |
| 2013/0329183 A1 | 12/2013 | Blum et al. | |
| 2017/0219831 A1 | 8/2017 | Haddick et al. | |
| 2017/0363885 A1 | 12/2017 | Blum et al. | |
| 2018/0103859 A1* | 4/2018 | Provenzano | ........... A61B 5/681 |
| 2019/0113774 A1 | 4/2019 | Anderson et al. | |
| 2020/0089008 A1 | 3/2020 | Silfvast et al. | |
| 2020/0202083 A1* | 6/2020 | Vartiovaara | ........ A61B 5/02055 |
| 2021/0076118 A1* | 3/2021 | Struzik | ................. H04R 1/1075 |
| 2022/0172443 A1* | 6/2022 | Han | ........................ G06F 3/013 |

OTHER PUBLICATIONS

YouTube video clip entitled "Titus Push Latch—Push Opening System for Doors and Drawers," 1 page, uploaded on Mar. 18, 2015 by user "Titus Group". Retrieved from Internet: <https://www.youtube.com/watch?v=HINht6yDzpM>.

International Search Report and the Written Opinion of the International Searching Authority, International Patent Application No. PCT/US2021/029845, pp. 1-14, dated Aug. 17, 2021.

International Search Report and the Written Opinion of the International Searching Authority, International Patent Application No. PCT/US2021/029352, pp. 1-16, dated Aug. 23, 2021.

* cited by examiner

HOST DETECTION AND ACOUSTIC MODULE DETECTION

BACKGROUND

Aspects and implementations of the present disclosure are generally directed to audio systems, for example, audio systems which include an open-ear acoustic module and a host device. Specifically, aspects and implementations of the present disclosure are related to detection of proximity between or engagement between an open-ear acoustic module and a host device.

SUMMARY OF THE DISCLOSURE

The present disclosure relates to audio systems and methods used to detect proximity between or engagement between a removable open-ear acoustic module and a host device. Upon detection of proximity or engagement, the audio system may adjust at least one device setting of the devices in the system. In some examples, the devices of the audio system are capable of obtaining specific identifying information about the other devices, and can be configured to adjust the at least one device setting based on device identity. For example, the adjusting the device settings can adjustments to a power state of the open-ear acoustic module, an audio equalization (EQ) setting, a volume setting, a bass level setting, a treble level setting, an Active Noise Reduction (ANR) setting, a user profile setting, selection of an algorithm of a plurality of algorithms related to data collection, a sensor calibration setting, and a user interface control setting.

Once the device identities are known, e.g., the open-ear acoustic module can know the identity of the host device that it is in proximity to or engaged with, the audio system can provide various benefits to users and/or the specific device manufacturers which provide the devices. For example, a host device could correspond to a specific type or brand of eyeglasses which are configured to engage with the open-ear acoustic module. Depending on the type, model, or identity of the eyeglasses, the open-ear acoustic module may engage with the frames in different positions with respect to the user or listener's head. Therefore, once the identity of the host device is known, and therefore the position of the open-ear acoustic module when placed on the specific host device is known, device settings of the open-ear acoustic module can be optimized or adjusted to enhance the quality of audio the user is receiving at their ears. Other benefits and advantages will be discussed below with respect to various example configurations.

In one example, a method for detecting a host device using a removable open-ear acoustic module is provided, the method including providing the removable open-ear acoustic module wherein the removable open-ear acoustic module is configured to generate acoustic energy outside of and proximate to a user's ear and configured to removably engage with a host device; detecting that the removable open-ear acoustic module is in proximity to the host device or engaged with the host device; and adjusting at least one device setting based at least in part on detecting that the removable open-ear acoustic module is in proximity to the host device or engaged with the host device.

In an aspect, the at least one device setting is associated with the host device, the removable open-ear acoustic module, or a peripheral device in communication with the host device or the removable open-ear acoustic module.

In an aspect, the at least one device setting is selected from: a power state of the open-ear acoustic module; an audio equalization (EQ) setting, a volume setting, a bass level setting, a treble level setting, an Active Noise Reduction (ANR) setting, a user profile setting, selection of an algorithm of a plurality of algorithms related to data collection, a sensor calibration setting, and a user interface control setting.

In an aspect, detecting that the removable open-ear acoustic module is in proximity to the host device includes at least one of: detection of the host device or the removable open-ear acoustic module via a Radio Frequency Identification (RFID) communication or Near-Field Communication (NFC); detection of the host device or the removable open-ear acoustic module via detection of a magnetic field above a minimum threshold; detection of proximity via a proximity sensor; detection of time-of-flight of a sound wave or a light wave; or, detection of proximity via a visual indicator.

In an aspect, the visual indicator is selected from: a Quick Response (QR) code, a barcode, or a colored portion of either the host device or the removable open-ear acoustic module.

In an aspect, detecting that the removable open-ear acoustic module is engaged with the host device includes at least one of: detection of electrical contact between a first contact pad arranged on the open-ear acoustic module and a second contact pad arranged on the host device; or, detection of engagement of the open-ear acoustic module and the host device via a two-pin connector interface.

In an aspect, detecting that the removable open-ear acoustic module is engaged with the host device includes receiving a user input, where the user input is selected from: engaging with a button or touch-capacitive sensor arranged on, in, or in communication with the host device or the removable open-ear acoustic module; a voice input; or, a gesture or motion of the user.

In an aspect, the host device is selected from: a pair of eyeglass frames, a pair of sunglass frames, a helmet, a visor, a hat, a headband, a pair of goggles, a charging case, a portable speaker housing, or a behind-the-ear module housing.

In an aspect, the method further includes detecting a position or location of the removable open-ear acoustic module relative to the host device; and, adjusting the at least one device setting based at least in part on the position or location of the removable open-ear acoustic module relative to the host device.

In an aspect, the method further includes: detecting a device type associated with the host device, a device brand associated with the host device, or an identity of a manufacturer of the host device; and, adjusting the at least one device setting based at least in part on the detected type, the detected brand, or the detected identity of the manufacturer of the host device.

In an example, a method for detecting a host device using a removable open-ear acoustic module is provided, the method including: providing the removable open-ear acoustic module wherein the removable open-ear acoustic module is configured to generate acoustic energy outside of and proximate to a user's ear and configured to removably engage with the host device; detecting that the removable open-ear acoustic module is in proximity to the host device or engaged with the host device; detecting a device type associated with the host device, a device brand associated with the host device, or an identity of a manufacturer of the host device; and, adjusting at least one device setting based at least in part on the detected type, the detected brand, or the detected identity of a manufacturer of the host device.

In an aspect, the at least one device setting is associated with the host device, the removable open-ear acoustic module, or a peripheral device in communication with the host device or the removable open-ear acoustic module.

In an aspect, the at least one device setting is selected from: a power state of the open-ear acoustic module; an audio equalization (EQ) setting, a volume setting, a bass level setting, a treble level setting, an Active Noise Reduction (ANR) setting, a user profile setting, selection of an algorithm of a plurality of algorithms related to data collection, a sensor calibration setting, and a user interface control setting.

In an aspect, detecting that the removable open-ear acoustic module is in proximity to the host device includes at least one of: detection of the host device or the removable open-ear acoustic module via a Radio Frequency Identification (RFID) communication or Near-Field Communication (NFC); detection of the host device or the removable open-ear acoustic module via detection of a magnetic field above a minimum threshold; detection of proximity via a proximity sensor; detection of time-of-flight of a sound wave or a light wave; or, detection of proximity via a visual indicator.

In an aspect, the visual indicator is selected from: a Quick Response (QR) code, a barcode, or a colored portion of either the host device or the removable open-ear acoustic module.

In an aspect, detecting that the removable open-ear acoustic module is engaged with the host device includes at least one of: detection of electrical contact between a first contact pad arranged on the open-ear acoustic module and a second contact pad arranged on the host device; or, detection of engagement of the open-ear acoustic module and the host device via a two-pin connector interface.

In an aspect, detecting that the removable open-ear acoustic module is engaged with the host device includes receiving a user input, where the user input is selected from: engaging with a button or touch-capacitive sensor arranged on, in, or in communication with the host device or the removable open-ear acoustic module; a voice input; or, a gesture or motion of the user.

In an aspect, the host device is selected from: a pair of eyeglass frames, a pair of sunglass frames, a helmet, a visor, a hat, a headband, a pair of goggles, a charging case, a portable speaker housing, or a behind-the-ear module housing.

In an aspect, the method further includes: obtaining a position or location of the removable open-ear acoustic module relative to the host device associated with the detected type, the detected brand, or the detected identity of a manufacturer of the host device; and, adjusting the at least one device setting based at least in part on the position or location of the removable open-ear acoustic module relative to the host device.

In an example, a method for detecting a removable open-ear acoustic module is provided, the method including: providing a host device, wherein the host device comprises a body having a pair of temples, wherein at least one of the temples is configured to removably engage with the removable open-ear acoustic module such that, when engaged, the removable open-ear acoustic module is configured to generate acoustic energy outside of and proximate to a user's ear; detecting that the removable open-ear acoustic module is in proximity to the host device or engaged with the host device; adjusting at least one device setting based at least in part on detecting that the removable open-ear acoustic module is in proximity to the host device or engaged with the host device.

In an aspect, the at least one device setting is associated with the host device, the removable open-ear acoustic module, or a peripheral device in communication with the host device or the removable open-ear acoustic module.

In an aspect, detecting that the removable open-ear acoustic module is in proximity to the host device includes at least one of: detection of the host device or the removable open-ear acoustic module via a Radio Frequency Identification (RFID) communication or Near-Field Communication (NFC); detection of the host device or the removable open-ear acoustic module via detection of a magnetic field above a minimum threshold; detection of proximity via a proximity sensor; detection of time-of-flight of a sound wave or a light wave; or, detection of proximity via a visual indicator.

In an aspect, detecting that the removable open-ear acoustic module is engaged with the host device includes at least one of: detection of electrical contact between a first contact pad arranged on the open-ear acoustic module and a second contact pad arranged on the host device; detection of engagement of the open-ear acoustic module and the host device via a two-pin connector interface; or, detecting receipt of a user input, where the user input is selected from: engaging with a button or touch-capacitive sensor arranged on, in, or in communication with the host device or the removable open-ear acoustic module; a voice input; or, a gesture or motion of the user.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure relates to audio systems and methods used to detect proximity between or engagement between a removable open-ear acoustic module and a host device. Upon detection of proximity or engagement, the audio system may adjust at least one device setting of the devices in the system. In some examples, the devices of the audio system are capable of obtaining specific identifying information about the other devices, and can be configured to adjust the at least one device setting based on device identity. For example, the adjusting the device settings can adjustments to a power state of the open-ear acoustic module, an audio equalization (EQ) setting, a volume setting, a bass level setting, a treble level setting, an Active Noise Reduction (ANR) setting, a user profile setting, selection of an algorithm of a plurality of algorithms related to data collection, a sensor calibration setting, and a user interface control setting.

Figure 1:
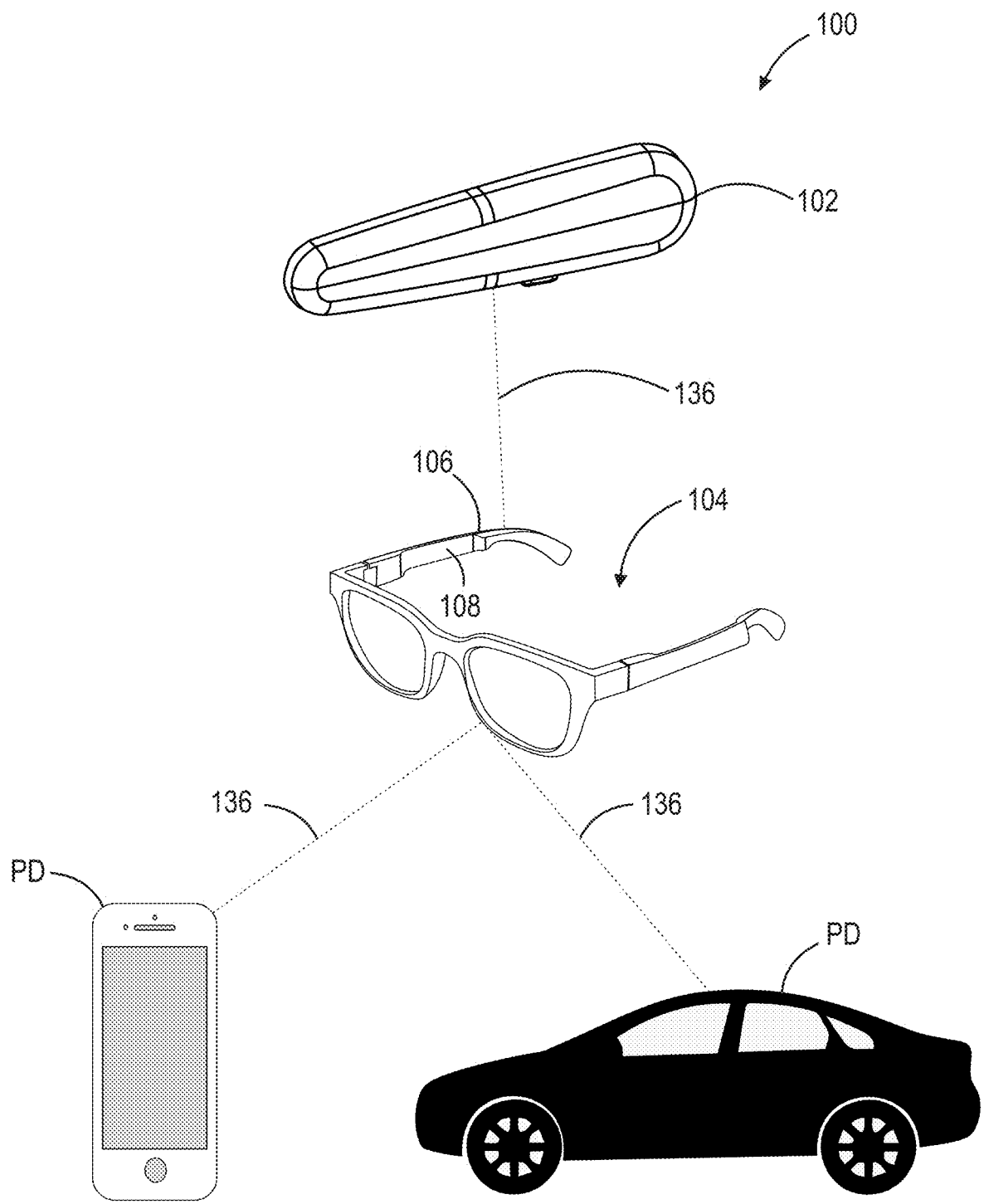
FIG. 1 is a schematic perspective view of an audio system according to the present disclosure.

The term "wearable audio device", as used in this application, in addition to its ordinary meaning known to those skilled in the art, is intended to mean a device that fits around, on, in, or near an ear (including open-ear audio devices worn on the head or shoulders of a user) and that radiates acoustic energy into or towards the ear. Wearable audio devices are sometimes referred to as headphones, earphones, earpieces, headsets, earbuds or sport headphones, and can be wired or wireless. A wearable audio device includes an acoustic driver to transduce audio signals to acoustic energy. The acoustic driver may be housed in an earcup. While some of the figures and descriptions following may show a single wearable audio device, having a pair of earcups (each including an acoustic driver) it should be appreciated that a wearable audio device may be a single stand-alone unit having only one earcup. Each earcup of the wearable audio device may be connected mechanically to another earcup or headphone, for example by a headband and/or by leads that conduct audio signals to an acoustic driver in the ear cup or headphone. A wearable audio device may include components for wirelessly receiving audio signals. A wearable audio device may include components of an active noise reduction (ANR) system. Wearable audio devices may also include other functionality such as a microphone so that they can function as a headset. While FIG. 1 shows an example of an audio eyeglasses form factor, in other examples the headset may be an in-ear, on-ear, around-ear, or near-ear headset. In some examples, a wearable audio device may be an open-ear device that includes an acoustic driver to radiate acoustic energy towards the ear while leaving the ear open to its environment and surroundings.

Figure 2:
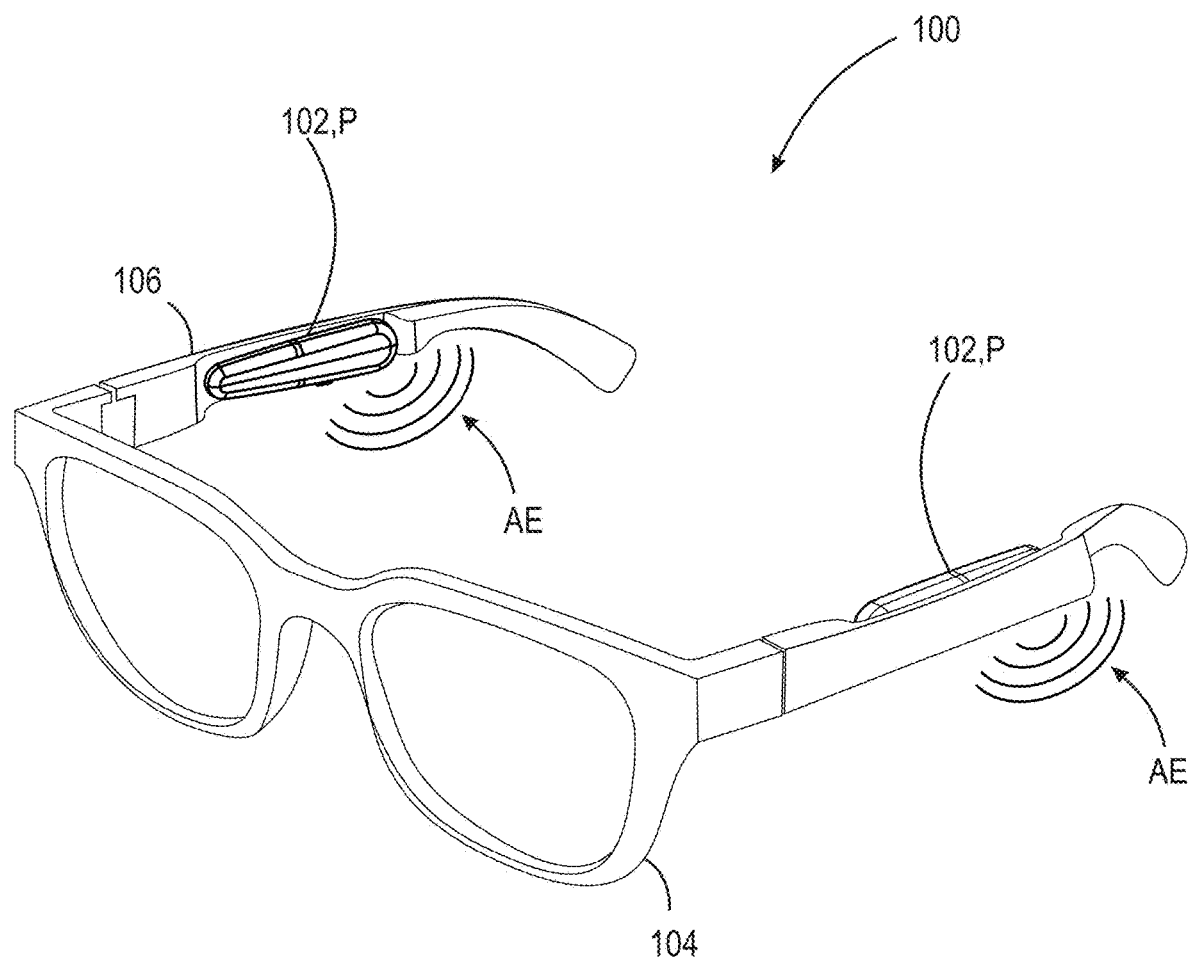
FIG. 2 is a schematic perspective view of a host device and a pair of removable open-ear acoustic modules according to the present disclosure.
Figure 5A:
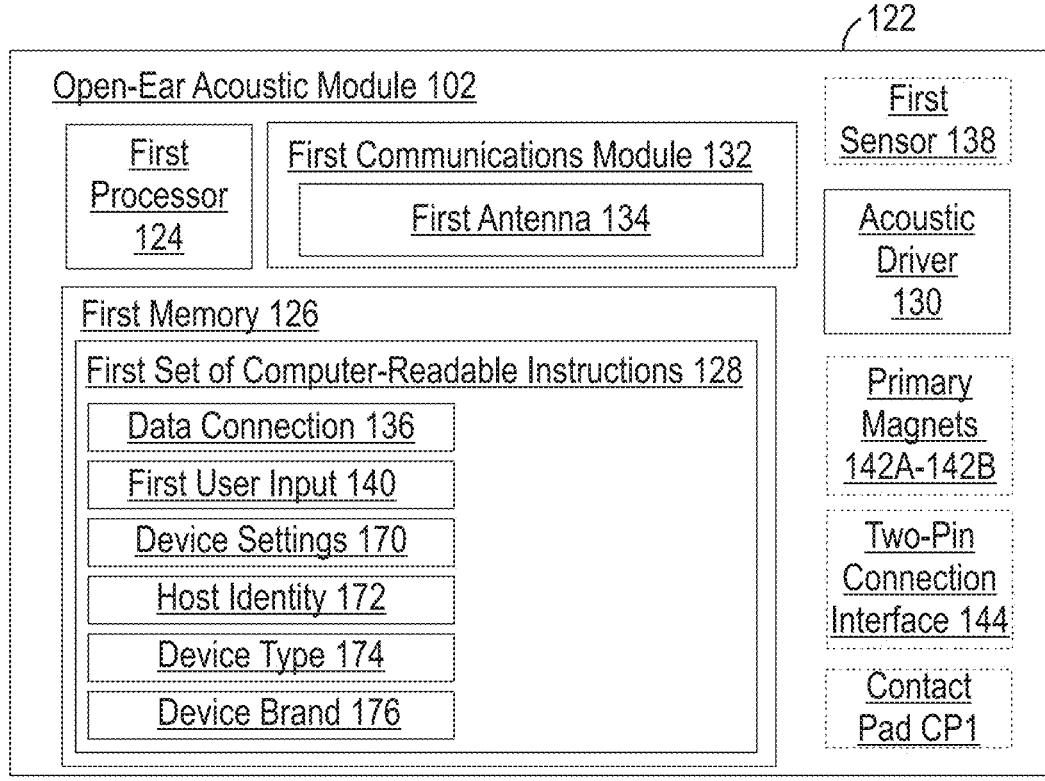
FIG. 5A is a schematic representation of the components and circuitry of an open-ear acoustic module according to the present disclosure.
Figure 5B:
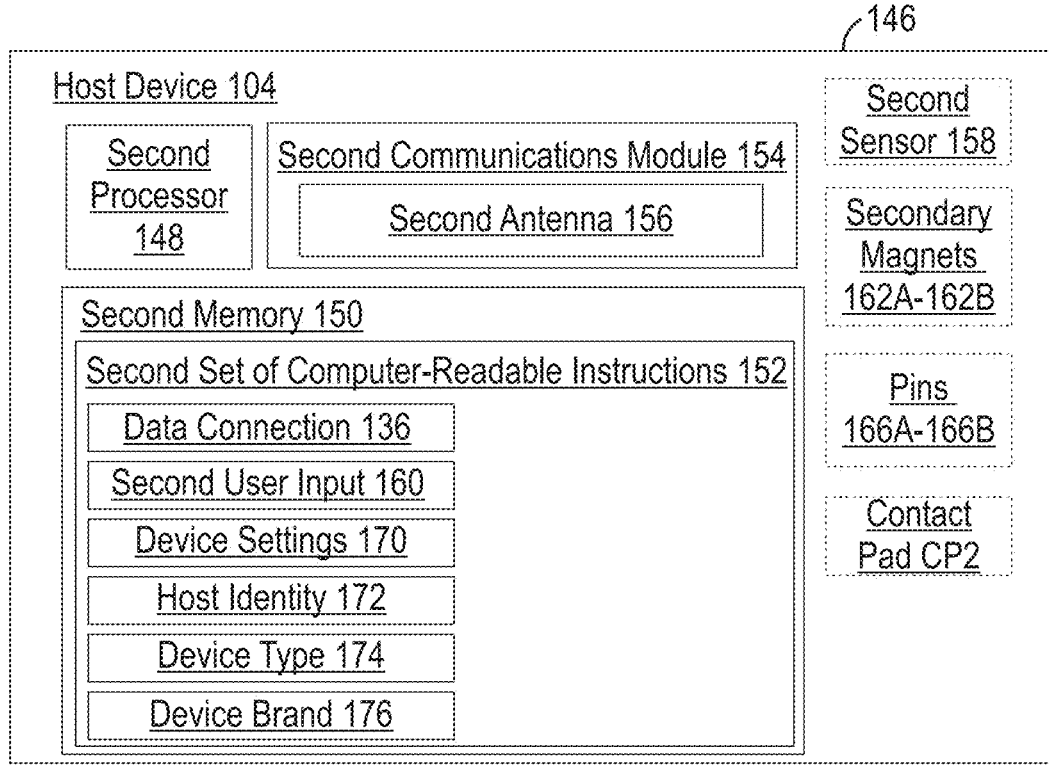
FIG. 5B is a schematic representation of the components and circuitry of host device according to the present disclosure.
Figure 6:
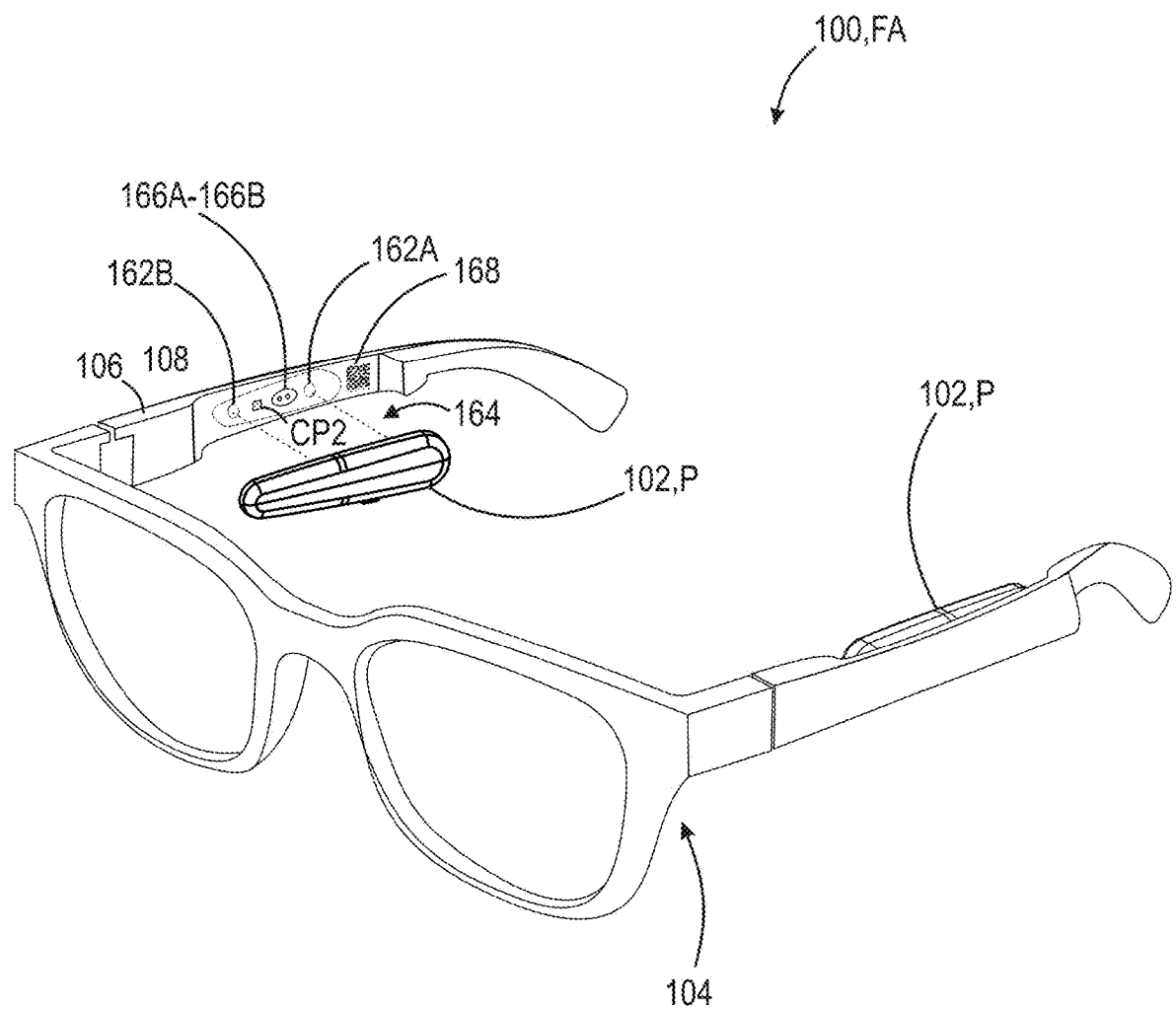
FIG. 6 is a schematic perspective view of host device and a pair of open-ear acoustic modules according to the present disclosure.

The following description should be read in view of FIGS. 1-6. FIG. 1 is a schematic view of audio system 100 according to the present disclosure. Audio system 100 includes at least one removable open-ear acoustic module 102 and at least one host device 104. Open-ear acoustic module 102 is intended to be any removable module having at least one acoustic driver and circuitry (e.g., first circuitry 122 discussed below) that are configured to generate or render acoustic energy AE (shown in FIG. 2), i.e., audible sound, outside of and proximate a user's ear. In some examples, as illustrated in FIGS. 2 and 6, open-ear acoustic module 102 is configured to generate acoustic energy AE proximate to a user's ear, but not configured to contact the user's ear while generating the acoustic energy AE. In other words, open-ear acoustic module 102 is an open-ear acoustic module, configured to generate acoustic energy AE outside of the user's ear canal and direct acoustic energy AE toward the user's ear canal. Although illustrated in FIG. 1 as a single open-ear acoustic module 102, it should be appreciated that more than one, e.g., two open-ear acoustic modules 102 can be utilized (as shown in FIGS. 2 and 6), i.e., one proximate to and outside of the user's right ear and one proximate to and outside of the user's left ear. Additionally, as will be discussed below, open-ear acoustic module 102 and/or host device 104 can be configured to detect that the open-ear acoustic module 102 is in proximity to, or engaged with, host device 104. Furthermore, as illustrated in FIG. 1, in some examples, host device 104 and/or open-ear acoustic module 102 are configured to establish a data connection, e.g., data connection 136, between each other, and/or an additional device, e.g., peripheral device PD (discussed below).

Host device 104 is intended to be a pair of eyeglasses, i.e., a wearable device having an eyeglass form factor, that is configured to receive and/or establish a connection with (e.g., data connection 136 discussed below), each open-ear acoustic module 102. In other examples, host device 104 is a pair of shop glasses or safety glasses, a hat, a headband, a hood, a helmet, a visor, a pair of goggles, e.g., ski goggles, an open audio device worn on the head, shoulders, or neck, a portable charging case, the housing of a portable speaker, a behind-the-ear module (e.g., a hearing-aid housing or other module housing configured to wrap around the back of a user's ear), or any other device worn on or in proximity to a user's head or neck. It should be appreciated that, while host device 104 can be any of the foregoing example devices, for simplicity, FIGS. 1-2 and 6 illustrate host device 104 as a pair of eyeglasses capable of engaging with and/or establishing a connection with, open-ear acoustic module 102. In these examples, it should be appreciated that host device 104 may further include at least one temple 106 having an inner surface 108 capable of engaging with open-ear acoustic module 102.

Figure 3:
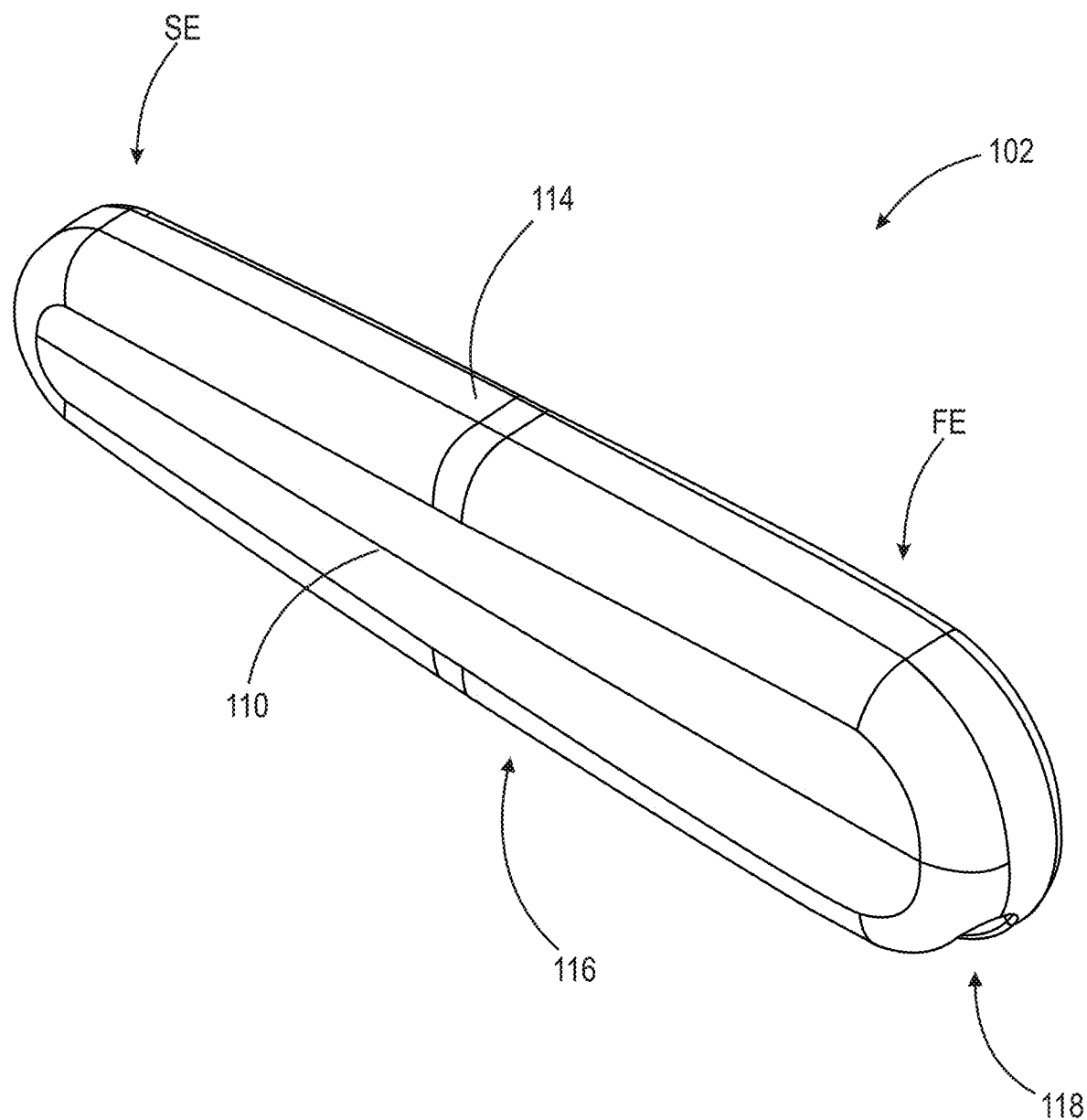
FIG. 3 is a perspective view of a front side of an open-ear acoustic module according to the present disclosure.
Figure 4:
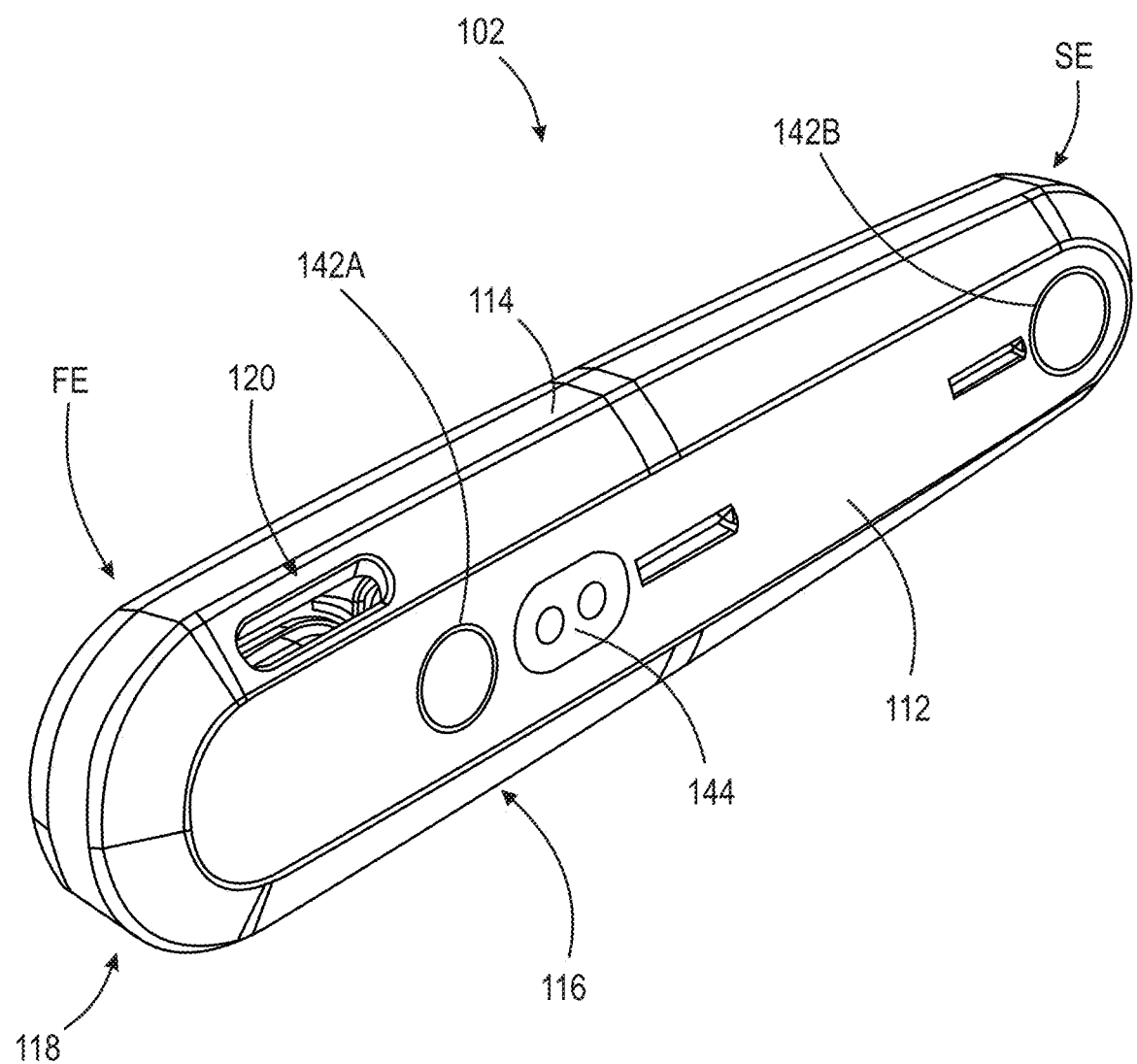
FIG. 4 is a perspective view of a rear side of an open-ear acoustic module according to the present disclosure.

As illustrated in FIGS. 3 and 4, which illustrate a front-side and rear-side view of open-ear acoustic module 102, respectively, open-ear acoustic module 102 has a first end FE and a second end SE, and further comprises a front side 110 extending between first end FE and second end SE, a rear side 112 extending between first end FE and second end SE and opposite front side 110, a top side 114 extending between first end FE and second end SE, and a bottom side 116 extending between first end FE and second end SE and opposite top side 114. As will be discussed below, rear side 112 can include embedded magnets, e.g., primary magnets 142A-142B (discussed below), and/or a two-pin connection interface 144 as well as various example sensors, e.g., first sensor 138 (discussed below). Additionally, open-ear acoustic module 102 may include a housing which is configured to at least partially encompass or surround the internal circuitry utilized to operate open-ear acoustic module 102, e.g., first circuitry 122 (discussed below). It should be appreciated that the housing of open-ear acoustic module 102 can be made from plastic materials, e.g., Polyethylene Terephthalate (PET), High-Density Polyethylene (HDPE), Low-Density Polyethylene (LDPE), Polyvinyl Chloride (PVC), Polypropylene (PP), Polystyrene (PS) or any other formable polymer. In some examples, the housing is made from metal, e.g., steel, aluminum, or other metallic materials. In one example, the housing is made of a ferrous metal. In some examples, as will be discussed below, the housing of the open-ear acoustic module 102 may be removably secured to a host device, e.g., host device 104, via magnetic attraction. In those examples, it should be appreciated that some or all of the housing can be made from a ferrous metal to shield the internal electronic components (discussed below) from interferences with the magnetic fields created.

In one example, as illustrated in FIGS. 3 and 4, open-ear acoustic module 102 includes two acoustic ports, i.e., first port 118 and second port 120, configured to allow acoustic energy AE to propagate out of the interior of the housing of open-ear acoustic module 102, into the air, and into the ear of the user. First port 118 may be acoustically coupled to a front side of an acoustic driver internal to the housing, and second port 120 may be acoustically coupled to a rear side of the acoustic driver. As shown in FIGS. 3 and 4, first port 118 is located proximate first end FE of open-ear acoustic module 102 and is configured such that, when open-ear acoustic module 102 is engaged with, proximate to, or in contact with host device 104, first port 118 is configured to direct acoustic energy AE directly to the ear of the user. In other words, first port 118 is configured to direct acoustic energy AE from first port 118 to the ear canal of the ear of a user where acoustic energy AE can propagate unimpeded to the ear canal of the user. Similarly, second port 120 is located proximate first end FE of open-ear acoustic module 102 and is further configured such that, when open-ear acoustic module 102 is engaged with, in proximity to, or in contact with host device 104, second port 120 is configured to direct acoustic energy AE away from the ear of the user. In one example, the size and positioning of each port, i.e., first port 118 and second port 120, can create two sources of acoustic energy AE outside of open-ear acoustic module 102. The two sources of acoustic energy AE, being in proximity to each other, creates an acoustic dipole to aid in the generation of acoustic energy AE that is perceived by the ears of the user. Although two ports are shown, there may be additional ports (i.e., more than one port acoustically coupled to the front side of open-ear acoustic module 102 and/or more than one port acoustically coupled to the rear side of the open-ear acoustic module 102). Proper acoustic tuning of the ports may be achieved through sizing of the ports and/or use of acoustic resistance material at the port openings. In addition, a screen may be used to prevent the ingress of particles such as dust or moisture into the ports.

As mentioned above and illustrated in FIG. 5A, open-ear acoustic module 102 further includes first circuitry 122. First circuitry 122 includes a first processor 124 and a first memory 126 arranged to execute and store, respectively, a first plurality of non-transitory computer-readable instructions 128 to perform the various functions of first circuitry 122 and open-ear acoustic module 102 as discussed herein. First circuitry 122 can also include an acoustic driver 130. Acoustic driver 130 is intended to be a component or series of components in electrical communication with first circuitry 122, which convert electrical signals into mechanical energy, such that the mechanical energy disturbs the surrounding air to create waves, e.g., sound waves. In one example, first memory 126 includes a plurality of music or audio files. In this example, first circuitry 122 can generate at least one electrical signal corresponding to at least a portion of one or more music or audio files of the plurality of music or audio files stored in first memory 126, and provide the at least one electrical signal to acoustic driver 130. Acoustic driver 130 then operates to generate discrete sound waves within the housing of open-ear acoustic module 102 which are allowed to propagate outside the housing via first port 118 and/or second port 120, potentially forming an acoustic dipole, such that the acoustic energy AE produced can propagate to the ear of a user.

First circuitry 122 can also include a first communications module 132 configured to send and/or receive data. First communications module 132 can also include first antenna 134 configured to send and/or receive a wireless data over a data connection 136, which utilizes at least one wireless protocol, where the wireless protocol is selected from at least one of: a Bluetooth protocol, a Bluetooth Low-Energy (BLE) protocol, a ZigBee protocol, a Wi-Fi (IEEE 802.11) protocol, iPod Accessory Protocol (iAP), Radio Frequency Communication (RFCOMM) Radio Frequency Identification (RFID), Near-field Magnetic Induction (NFMI), Near-Field Electromagnetic Induction (NFEMI), Near Field Communications (NFC), or any other wireless protocol for establishing a communication connection, e.g., data connection 136, between open-ear acoustic module 102 and another device, e.g., host device 104 and/or peripheral device PD. In some examples, as will be described below, first communications module 132 may utilize first antenna 134 to establish a data connection 136 with host device 104.

First communications module 132 can also be configured to send and/or receive data via a wired connection. For example, first communications module 132 may include a data port configured to receive data via a cable or other physical data connection, such that, e.g., the plurality of music or audio files described above may be stored in first memory 126 of open-ear acoustic module 102 before, during, or after engaging with or being positioned in proximity to host device 104.

Open-ear acoustic module 102 can also include at least one sensor, e.g., first sensor 138, located on, in, or in communication with first circuitry 122. First sensor 138 can be selected from a button, a touch-capacitive sensor or surface, a gyroscope, an accelerometer, a magnetometer, a microphone, an ultra-violet (UV) light sensor, an infrared (IR) sensor, an ultrasonic sensor, a proximity sensor (e.g., a Radio Detection and Ranging (RADAR) or a Light Detection and Ranging (LIDAR) sensor), or a camera. Additionally, although not illustrated, it should be appreciated that first circuitry 122 may include a battery, e.g., a lithium-ion battery, a capacitor, a supercapacitor or other power supply or electrical energy storage device capable of providing store electrical power to open-ear acoustic module 102 and/or host device 104 (as will be discussed below). It should be appreciated that first sensor 138 can be utilized by the user U as a means for generating a user input, e.g., first user input 140 (discussed below).

Additionally, as illustrated in FIG. 4, open-ear acoustic module 102 can include one or more primary magnets, e.g., primary magnet 142A and 142B which are configured to magnetically couple with at least a portion of host device 104. In one example, primary magnets 142A-142B are configured to magnetically engage with a portion of temple 106 of host device 104, or may be configured to magnetically engage with a portion of inner surface 108 of temple 106. In other examples, as will be discussed below, each primary magnet 142A-142B is configured to magnetically engage with a complementary pair of secondary magnets 162A-162B and generate a magnetic field 164 (also discussed below), which can be detected by either open-ear acoustic module 102 or host device 104. Furthermore, as shown in FIG. 4, open-ear acoustic module 102 may further include a two-pin connection interface 144 or a first electrical contact pad CP1, configured to physically engage with at least a portion of host device 104, e.g., a complementary pair of pins or contact pads (e.g., pins 166A-166B or contact pad CP2 discussed below and shown in FIG. 6), to exchange data, e.g., via data connection 136, or exchange electrical power, e.g., to or from the battery or other electrical storage device of open-ear acoustic module 102.

In some examples, as illustrated in FIG. 5B, host device 104 can include similar circuitry, e.g., second circuitry 146.

Second circuitry 146 includes a second processor 148 and a second memory 150 arranged to execute and store, respectively, a second plurality of non-transitory computer-readable instructions 152 to perform the various functions of second circuitry 146 and host device 104 as discussed herein. Second circuitry 146 can also include a second communications module 154 configured to send and/or receive data. Second communications module 154 can also include second antenna 156 configured to send and/or receive a wireless data over a data connection 136, which utilizes at least one wireless protocol, where the wireless protocol is selected from at least one of: a Bluetooth protocol, a Bluetooth Low-Energy (BLE) protocol, a ZigBee protocol, a Wi-Fi (IEEE 802.11) protocol, iPod Accessory Protocol (iAP), Radio Frequency Communication (RF-COMM) Radio Frequency Identification (RFID), Near-field Magnetic Induction (NFMI), Near-Field Electromagnetic Induction (NFEMI), Near Field Communications (NFC), or any other wireless protocol for establishing a communication connection, e.g., data connection 136, between host device 104 and another device, e.g., open-ear acoustic module 102 and/or peripheral device PD. In some examples, as will be described below, second communications module 154 may utilize second antenna 156 to establish a data connection 136 with open-ear acoustic module 102.

Second communications module 154 can also be configured to send and/or receive data via a wired connection. For example, second communications module 154 may include a data port configured to receive data via a cable or other physical data connection, such that, e.g., the plurality of music or audio files described above may be stored in second memory 150 of host device 104 before, during, or after engaging with or being positioned in proximity to open-ear acoustic module 102. Furthermore, host device 104 can also include at least one sensor, e.g., second sensor 158, located on, in, or in communication with second circuitry 146. Second sensor 158 can be selected from a button, a touch-capacitive sensor or surface, a gyroscope, an accelerometer, a magnetometer, a microphone, an ultra-violet (UV) light sensor, an infrared (IR) sensor, an ultrasonic sensor, a proximity sensor (e.g., a RADAR or LIDAR sensor), or a camera. Additionally, although not illustrated, it should be appreciated that second circuitry 146 may include a battery, e.g., a lithium-ion battery, a capacitor, a supercapacitor or other power supply or electrical energy storage device capable of providing store electrical power to host device 104 and/or open-ear acoustic module 102 (as will be discussed below). It should be appreciated that second sensor 158 can be utilized by the user U as a means for generating a user input, e.g., second user input 160 (discussed below).

Additionally, as illustrated in FIG. 4 and mentioned above, in one example, host device 104 can include one or more secondary magnets, e.g., secondary magnet 162A and 162B which are configured to magnetically couple with, e.g., primary magnets 142A and 142B, respectively, to magnetically secure or engage open-ear acoustic module 102 with host device 104. In one example, secondary magnets 162A and 162B are recessing within or otherwise secured to a portion of temple 106 of host device 104, or may be recessed within or otherwise secured to a portion of inner surface 108 of temple 106. As will be discussed below, in some examples, each primary magnet 142A-142B is configured to magnetically engage with the complementary pair of secondary magnets 162A and 162B and generate a magnetic field 164 (shown in FIG. 6) which can be detected by either open-ear acoustic module 102 or host device 104. Furthermore, as shown in FIG. 6, host device 104 may further include a one or more pins 166A-166B configured to matingly and electrically engage with two-pin connection interface 144 of open-ear acoustic module 102 (as discussed above). In other words, open-ear acoustic module 102 and host device 104 can be configured to physically engage with each other, via pins 166A-166B of host device 104 and two-pin connection interface 144 of open-ear acoustic module 102. The physical connection between the two devices can be used to exchange data, e.g., via data connection 136, or exchange electrical power, e.g., to or from the battery or other electrical storage device of open-ear acoustic module 102 and/or the battery or other electrical storage device of host device 104.

As discussed above and illustrated in FIG. 1, audio system 100 may further include a peripheral device PD. Peripheral device PD is intended to be a personal computer (PC), smartphone, tablet, smart watch, vehicle, or any other device capable of establishing a wired or wireless data connection, e.g., data connection 136 with open-ear acoustic module 102 and/or host device 104. It should be appreciated that, although not illustrated, peripheral device PD may include circuitry which includes at least one of each component discussed above with respect to first circuitry 122 of open-ear acoustic module 102 and/or second circuitry 146 of host device 104. For example, peripheral device may include one or more, processors, memory, computer-readable instructions, a communication module having at least one antenna, at least one sensor, and at least one battery or other electrical storage device. In one example, peripheral device PD may utilize its respective communications module and/or antenna to establish a data connection, e.g., data connection 136, to send and/or receive data corresponding with a music stream or other media stream from peripheral device PD to either open-ear acoustic module 102 or host device 104. In one example, peripheral device PD is a smartphone capable of establishing a paired Bluetooth connection with open-ear acoustic module 102 and/or host device 104. In another example, peripheral device PD is a car or other vehicle having electronics capable of establishing a paired Bluetooth connection with open-ear acoustic module 102 and/or host device 104.

As mentioned above, and illustrated in FIG. 6, open-ear acoustic module 102 and/or host device 104 can be configured to detect whether each device of audio system 100 is in proximity to or engaged with each other. Detection of proximity between devices of audio system 100, e.g., detection of proximity between open-ear acoustic device 102 may include detection of the host device or the removable open-ear acoustic module via a Radio Frequency Identification (RFID) communication or Near-Field Communication (NFC), e.g., over data connection 136 or via separate RFID or NFC chips provided within first circuitry 122 and/or second circuitry 146. Detection of proximity between open-ear acoustic module 102 and host device 104 can also include detection of a magnetic field above a first minimum threshold, e.g., by first sensor 138 where first sensor 138 is a magnetometer and where magnetic field 164 between primary magnets 142A-142B of open-ear acoustic module 102 and secondary magnets 162A-162B raises above a first minimum threshold. Furthermore, detection of proximity between open-ear acoustic module 102 and host device 104 can include detection via at least one visual sensor, e.g., via first sensor 138 of open-ear acoustic module 102 or second sensor 158 of host device 104, where each sensor is selected as a sensor having the ability to obtain image data or other visual data of at least a portion of each other, e.g., a proximity detector or camera. In one example, as illustrated in FIG. 6, host device 104 includes temple 106 having an inner surface 108. In this example, inner surface 108 can include at least one visual indicator 168, and first sensor 138 of open-ear acoustic module 102 (not shown in FIG. 6) can capture an image or image data of the at least one visual indicator 168 to indicate proximity to host device 104. Visual indicator 168 can be selected from a Quick Response (QR) code, a barcode, a colored portion or pattern of either host device 104 or open-ear acoustic module 102. It should be appreciated that although visual indicator 168 is illustrated on host device 104 where first sensor 138 is configured to capture image data relating to visual indicator 168, it should be appreciated that visual indicator 168 can be provided on at least a portion of open-ear acoustic module 102 (e.g., on rear side 112) and second sensor 158 of host device 104 can be configured to capture the image data of the visual indicator 168. In another example, first sensor 138 is selected from a proximity sensor, e.g., a RADAR or LIDAR sensor, and is configured to detect proximity between open-ear acoustic module 102 and host device 104 by measuring a time-of-flight of a sound wave or beam of light generated by first sensor 138 that is reflected off of, e.g., host device 104 and received at first sensor 138. The time that it takes for the beam to travel to host device 104 and reflect back to first sensor 138 can be utilized to measure distance and therefore proximity to host device 104.

Detection of physical engagement between the devices of audio system 100 can include receiving a user input, e.g., first user input 140 or second user input 160. Additionally, it should be appreciated that a user input could be provided by a button or touch-capacitive sensor located on peripheral device PD as well. In another example, detection of physical engagement can include receipt of a user input, e.g., first input 140 or second input 160 in the form of a voice input generated by first sensor 138 or second sensor 158 where first sensor 138 or second sensor 158 is a microphone. Another example of detection of physical engagement can include detection of a receipt of a user input, e.g., first input 140 or second input 160 in the form of a gesture or motion of the user generated by first sensor 138 or second sensor 158 where first sensor 138 or second sensor 158 is a gyroscope, accelerometer, and/or magnetometer. Visual indicator 168 can also be used to detected engagement between open-ear acoustic module 102 and host device 104. For example, first sensor 138 and/or second sensor 158 may be selected from a proximity detector or other visual sensor having the ability to obtain image data or other visual data of at least a portion of host device 104 and/or open-ear acoustic module 102, respectively. In these examples, the sensors may detect from the image data captured that the visual indicator 168 visible on at least a portion of the other device is within a predetermined distance, e.g., based on the size of the image relative to the sensor's resolution. If the image data indicates that the image is within the predetermined distance, audio system 100 may consider open-ear acoustic module 102 and host device 104 engaged. Detection of engagement between open-ear acoustic module 102 and host device 104 can also include detection of a magnetic field above a second minimum threshold, e.g., where magnetic field 164 between primary magnets 142A-142B of open-ear acoustic module 102 and secondary magnets 162A-162B raises above a second minimum threshold greater than the first minimum threshold. For example, a second threshold may be established requiring a stronger magnetic field force to be detected between the devices to determine that they are engaged rather than in proximity. In another example, detecting that open-ear acoustic module 102 is engaged with host device 104 includes detection of physical electrical contact between a two-pin connection interface 144 or a first electrical contact pad CP1 of open-ear acoustic module 102 with a complementary pair of pins 166A-166B or complementary contact pad CP2 of host device 104. In another example, first sensor 138 is selected from a proximity sensor, e.g., a RADAR or LIDAR sensor, and is configured to detect engagement between open-ear acoustic module 102 and host device 104 by measuring a time-of-flight of a sound wave or beam of light generated by first sensor 138 that is reflected off of, e.g., host device 104 and received at first sensor 138. The time that it takes for the beam to travel to host device 104 and reflect back to first sensor 138 can be utilized to measure distance and therefore proximity to host device 104. Should the distance be within a predetermined threshold, open-ear acoustic module 102 can detect that open-ear acoustic module 102 is engaged with host device 104.

In one example, as a result of detecting proximity to or engagement between open-ear acoustic module 102 and a host device, e.g., host device 104, at least one device of audio system 100 is configured to adjust or alter at least one device setting 170. At least one device setting 170 can be selected from: a power state of the open-ear acoustic module (e.g., awakening from a sleep or hibernation state or switching between an off state and an on state); an audio equalization (EQ) setting (e.g., applying a gain, amplification, attenuation or other filter to an audio signal), a volume setting (e.g., increase, decrease, or limit), a bass level setting (e.g., increase, decrease or limit), a treble level setting (e.g., increase, decrease or limit), an Active Noise Reduction (ANR) setting (e.g., increase, decrease or limit), a user profile setting, selection of an algorithm of a plurality of algorithms related to data collection, a sensor calibration setting, a user interface control setting (e.g., switching between predetermined user profiles). For example, adjusting a power state of open-ear acoustic module 102 can correspond to switching open-ear acoustic module 102 between an on state, and off state, a sleep state or hibernation states or between different levels of sleep states or hibernation states, e.g., where one level of hibernation state is capable of receiving device updates, while a second level of hibernation state is not. Adjusting an audio equalization (EQ) setting can correspond to amplifying, attenuating, or otherwise filtering at least a portion of an audio signal, e.g., the audio signals for generating acoustic energy AE from acoustic driver 130 (discussed above). Adjusting a user profile setting may include switching between or cycling through individual user profiles saved within, e.g., first memory 126, second memory 150, or the memory of peripheral device PD. Furthermore, adjusting a user interface control setting can include changing between a plurality of pre-set user interfaces, e.g., one for each host identity In addition to the adjustments discussed above, selection of an algorithm of a plurality of algorithms related to data collection corresponds to selection of one or more algorithms saved within, e.g., first memory 126, second memory 150, or the memory of peripheral device PD, that are capable of obtaining data about host device 104 and/or open-ear acoustic module 102, motion of the user, or user behavior. For example, if first sensor 138 and/or second sensor 158 are selected from a gyroscope, accelerometer, and magnetometer, audio system 100 can switch between or begin using an algorithm for collecting motion data about the user. These adjustments will be discussed below in further detail.

In addition to detecting proximity to or engagement between each device, open-ear acoustic module 102 may detect the identity of host device 104 that the open-ear acoustic module 102 is in proximity to or engaged with, i.e., host identity 172. It should be appreciated that host identity 172 can include a device type 174 and a device brand 176. For example, host device 104 may have a certain device type, e.g., a pair of eyeglass frames, a stand-alone speaker, etc., and may have a specific model or shape and be provided by a specific retailer or manufacturer. Once the device type or model and/or the specific retailer or manufacturer are known to the open-ear acoustic module 102, the adjustments to the device settings 170 discussed above, may be specific adjustments associated with the known position P of the open-ear acoustic module 102 when engaged with that specific host device 104. For example, open-ear acoustic module 102, either through data connection 136 (e.g. using at least one portion of at least one packet exchanged in data connection 136), through RFID or NFC communications, or through a visual indication (e.g., visual indicator 168) open-ear acoustic module 102 can be configured to obtain the type of host device 104 and/or the host identity 172 of the specific retailer or manufacturer of host device 104. Once the type of device and/or the host identity 172 of host device 104 is known, adjustments to the device settings 170 discussed above can be specific to the known location or position P of open-ear acoustic module 102 while attached to or engaged with the specific host device 104 having host identity 172. For example, a specific host device 104 having a device type associated with an eyeglass form factor of a first retailer or manufacturer may connect with open-ear acoustic module 102 at a predetermined/known position P with respect to the user's head or ears. Thus, adjustments to, e.g., an equalization setting, may include applying gains, attenuations or other acoustic filters to account for the known location or positions P of open-ear acoustic module 102 with respect to the user's ears while engaged with the specific host device 104. In another example, determining the host identity 172 may reveal engagement with or proximity to host device 104 where host device 104 is an eyeglass form factor of a different or second retailer or manufacturer, where it is known that the position P of an engaged open-ear acoustic module 102 is different from the position P discussed above with respect to the host device 104 from the first retailer or manufacturer. Thus, adjustments to device settings 170 may be based on the specific device type or specific host identity 172 of the host device 104. Although not discussed in detail, it should be appreciated that specific adjustments to device settings 170 can be specific to a range of different host device types, e.g., shop glasses or safety glasses, hats, headbands, hoods, helmets, visors, goggles, open audio devices worn on the head, shoulders, or neck, portable charging cases, portable speaker housings, and behind-the-ear modules. Each device type may engage with open-ear acoustic module 102 in different positions, locations, or orientations with respect to the user's ears, and therefore, detection of host identify 172 or device type can provide specific adjustments for each device type discussed above, as well as different variations of each device type specific to the retailer or manufacturer which provides each device.

Once open-ear acoustic module 102 is capable of obtaining or determining the device types and/or host identities 172 of the host device 104 that it is in proximity to or engaged with, additional benefits to the users and/or the specific device manufacturers are realized. For example, a workplace that is subject to various regulation requirements may utilize detection of a pair of shop glasses or work glasses, regardless of the specific manufacturer, adjust a volume setting of the open-ear acoustic module 102 so that the volume of acoustic energy AE cannot rise above a predetermined threshold such that a worker using audio system 100 can still hear the surrounding environment and can avoid workplace accidents. Additionally, known positions P and locations of open-ear acoustic module 102 with respect to the host device 104 and/or the users' head or ears, can be utilized to calibrate sensor data, e.g., data obtained by first sensor 138, so that motion of the user or motion of the user's head can accurately be determined once engaged with a specific host device 104. For example, certain host devices 104 may allow engagement with open-ear acoustic module 102 at different positions P with respect to the user's head. Thus, and rotational, pivoting, tilting, and other movement or gesture related motion data, must be calibrated based on the different positions P of the open-ear acoustic module 102 with respect to the user's head. Furthermore, calibration can include spatial calibration for use with microphone type sensors, e.g., to tune beam forming techniques and/or algorithms to adjust for the different positions P of open-ear acoustic module 102 with respect to the user's head and/or mouth.

As an additional benefit to retailers, once open-ear acoustic module 102 can detect the specific host device 104 that it is engaged with or in proximity to, open-ear acoustic module 102 can track or otherwise observe data related to usage of different host devices 104 by users. Knowing which host devices 104 are connected to open-ear acoustic module 102 may also allow for monitoring of manufacturer and retailer partnerships by tracking usage of the specific partners host devices 104 as well as any royalties owed based on usage. One additional benefit of audio system 100, is that in examples where visual indicators 168 are utilized to detect proximity to or engagement with a host device 104 use of specific may be utilized by audio system 100 to determine counterfeit host devices 104. Additional unique identifiers may be utilized, e.g., use of specific two-pin connector interface 144, specific magnets having unique configurations, a unique configuration of contact pads, could also be used to identify counterfeit host devices 104.

Additionally, as discussed above, detection of a certain host device 104 may alter which device within audio system 102 provides an audio signal or which device an audio signal is provided to for the ultimate generation of acoustic energy AE proximate the user. For example, host device 104 may be a pair of sunglasses (typically used while driving a vehicle on a sunny day) and audio system 100 may include a peripheral device PD, e.g., a vehicle (as shown in FIG. 1). In this example, open-ear acoustic module 102 may detect proximity with or engagement with host device 104 and audio system 100 may detect that the host identity 172 is a pair of sunglasses from a certain retailer or manufacturer. Audio system 100 may be configured to provide an audio signal, e.g., via data connection 136, from open-ear acoustic module 102 to the vehicle, i.e., peripheral device PD, so that the vehicle may use the audio signal to provide an audio playback of acoustic energy AE by the vehicle's sound system. Thus, detection of the use of sunglasses may be used to inform audio system 100 that audio signals and/or audio data should be passed to a vehicle audio system should one be within range of open-ear acoustic module 102.

In another example, open-ear acoustic module 102 and/or a peripheral device PD may store and is capable of switching between or otherwise cycling through a plurality of profiles corresponding with proximity or engagement with a plurality of different host devices 104. For example, should a user repeatedly used open-ear acoustic module 102 with a plurality of host device 104, e.g., with a pair of glasses, a pair of sunglasses, and a helmet, open-ear acoustic module 102 may be capable of receiving a user input, e.g., first user input 140, second user input 160, and/or a user input located on peripheral device PD, to cycle through known host devices 104 where each host device can be associated with a profile having different device settings 170 tuned to each device as discussed above.

During operation, in one example, audio system 100 may alter a device setting 170, based on detection of proximity between or engagement between open-ear acoustic module 102 and a host device, e.g., host device 104 embodied as a pair of eyeglass frames as illustrated in FIGS. 1-2 and 6. In this example, a user may bring open-ear acoustic module 102 within proximity, e.g., within 2-5 cm, of inner surface 108 of temple 106 of host device 104 and open-ear acoustic module 102 may detect this proximity via a Radio Frequency Identification (RFID) communication or Near-Field Communication (NFC), via detection of a magnetic field 164 above a first minimum threshold, via at least one visual sensor, e.g., via first sensor 138 viewing at least one visual indicator 168 located on host device 104. Upon detection of proximity between open-ear acoustic module 102 and host device 104 as discussed above, audio system 100 may alter at least one device setting 170, e.g., if open-ear acoustic module 102 was off or in a sleep or hibernation state, audio system 100 could automatically switch open-ear acoustic module into an on state or into a wake state or active state so that it may generate acoustic energy AE proximity the users ear. As an alternative, audio system 100 can be configured to alter the device setting based on engagement with host device 104 rather than proximity to host device 104. For example, the user may bring open-ear acoustic module 102 in contact with host device 104, e.g., where at least a portion of rear side 112 of open-ear acoustic module 102 is in contact with inner surface 108 of temple 106 of host device 104. Audio system 100 may detect this engagement via receipt of a user input, e.g., first user input 140, second user input 160, or a user input from peripheral device PD; via detection of magnetic field 164 above a second threshold higher than the first minimum threshold discussed above; via electrical contact between two-pin connector interface 144 and pins 166A-166B or between contact pads CP1-CP2. Upon detection of engagement between open-ear acoustic module 102 and host device 104 as discussed above, audio system 100 may alter at least one device setting 170, e.g., if open-ear acoustic module 102 was off or in a sleep or hibernation state, audio system 100 could automatically switch open-ear acoustic module into an on state or into a wake state or active state so that it may generate acoustic energy AE proximity the users ear.

In another example operation, audio system 100 may alter a device setting 170, e.g., an equalization setting, based on detection of proximity between or engagement between open-ear acoustic module 102 and a host device having a specific host identity 172, e.g., host device 104 embodied as a pair of eyeglass frames from a specific manufacturer. In this example, a user may bring open-ear acoustic module 102 within proximity, e.g., within 2-5 cm, of inner surface 108 of temple 106 of the specific host device 104 and open-ear acoustic module 102 may detect this proximity via a Radio Frequency Identification (RFID) communication or Near-Field Communication (NFC), via detection of a magnetic field 164 above a first minimum threshold, via at least one visual sensor, e.g., via first sensor 138 viewing at least one visual indicator 168 located on host device 104. Additionally, either through data connection 136 (e.g. using at least one portion of at least one packet exchanged in data connection 136), through RFID or NFC communications, or through a visual indication (e.g., visual indicator 168) open-ear acoustic module 102 can be configured to obtain the device type and/or host identity 172 of the specific retailer or manufacturer of host device 104. Upon detection of proximity between open-ear acoustic module 102 and host device 104 having a specific host identity 172, audio system 100 may alter at least one device setting 170 specific to the position P and orientation that open-ear acoustic module 102 will be placed in relative to the user's ears while engaged with the specific host device 104. For example, an equalization setting, e.g., attenuation may be applied to at least a portion of a given audio signal to account for an increase in distance between a typical engagement position and the specific position P that acoustic module 102 will be placed due to the design or configuration of the specific host entity 172. As an alternative, audio system 100 can be configured to alter the device setting based on engagement with host device 104 rather than proximity to host device 104.

In a further operation, audio system 100 may alter a device setting 170, e.g., a calibration setting, based on detection of proximity between or engagement between open-ear acoustic module 102 and a host device having a specific host identity 172, e.g., host device 104 embodied as a pair of eyeglass frames from a specific manufacturer. In this example, a user may bring open-ear acoustic module 102 within proximity, e.g., within 2-5 cm, of inner surface 108 of temple 106 of the specific host device 104 and open-ear acoustic module 102 may detect this proximity via a Radio Frequency Identification (RFID) communication or Near-Field Communication (NFC), via detection of a magnetic field 164 above a first minimum threshold, via at least one visual sensor, e.g., via first sensor 138 viewing at least one visual indicator 168 located on host device 104. Additionally, either through data connection 136 (e.g. using at least one portion of at least one packet exchanged in data connection 136), through RFID or NFC communications, or through a visual indication (e.g., visual indicator 168) open-ear acoustic module 102 can be configured to obtain the device type and/or host identity 172 of the specific retailer or manufacturer of host device 104. Upon detection of proximity between open-ear acoustic module 102 and host device 104 having a specific host identity 172, audio system 100 may alter at least one device setting 170 specific to the position P and orientation that open-ear acoustic module 102 will be placed in relative to the user's ears while engaged with the specific host device 104. For example, first sensor 138 of open-ear acoustic module 102 may be embodied as at least one of: a gyroscope, accelerometer, and/or a magnetometer. As the perceived tilts, pivots, rotations, or other movements of these sensors must be calibrated to determine each motion from a reference point, e.g., the center of the user's head or the center of host device 104, calibration of this center with respect to the position P of open-ear acoustic module can be adjusted based on the specific position P of open-ear acoustic module 102 as it is secured to the specific host device 104, e.g., should host identity 172 reveal that open-ear acoustic module 102 typically sits back, i.e., close to the user's ears on a specific host device 104, the calibration of first sensor 138 for the purpose of obtaining motion or gesture data must be altered to account for this change. As an alternative, audio system 100 can be configured to alter the device setting based on engagement with host device 104 rather than proximity to host device 104.

In a further operation, audio system 100 may pass audio data, e.g., audio data relating to one or more music files or an audio stream to a peripheral device PD, based on detection of proximity between or engagement between open-ear acoustic module 102 and a host device having a specific host identity 172, e.g., host device 104 embodied as a pair of sunglasses frames from a specific manufacturer. In this example, a user may bring open-ear acoustic module 102 within proximity, e.g., within 2-5 cm, of inner surface 108 of temple 106 of the specific host device 104 and open-ear acoustic module 102 may detect this proximity via a Radio Frequency Identification (RFID) communication or Near-Field Communication (NFC), via detection of a magnetic field 164 above a first minimum threshold, via at least one visual sensor, e.g., via first sensor 138 viewing at least one visual indicator 168 located on host device 104. Additionally, either through data connection 136 (e.g. using at least one portion of at least one packet exchanged in data connection 136), through RFID or NFC communications, or through a visual indication (e.g., visual indicator 168) open-ear acoustic module 102 can be configured to obtain the device type and/or host identity 172 of the specific retailer or manufacturer of host device 104, as well as determine that open-ear acoustic module 102 and/or host device 104 is in wireless range of a peripheral device PD, e.g., a smartphone or a vehicle. Upon detection of proximity between open-ear acoustic module 102 and host device 104 having a specific host identity 172, audio system 100 may pass audio data, e.g., from host device 104 or open-ear acoustic device 102, to peripheral device PD for the production of acoustic energy AE proximate the user. For example, as host device 104 may be embodied as a pair of sunglasses which are typically worn while driving. Should host identity 172 reveal that host device 104 is a pair of sunglasses, and that open-ear acoustic device 102 is also connected to or capable of connecting to peripheral device PD, e.g., a Bluetooth enabled vehicle computer, open-ear acoustic module 102 may pass audio data to the vehicle via data connection 136 so that the vehicle can produce an audio playback associated with the audio data through the vehicle's built in audio system. In a further example, open-ear acoustic module 102 and/or host device 104 are capable of establishing a first data connection with a first peripheral device, e.g., a smart phone, as well as a second data connection with a second peripheral device, e.g., a vehicle computer. In this example, audio data may be stored and sent from the first peripheral device PD (a smart phone) to host device 104 and/or open-ear acoustic module 102 via data connection 136. Should audio system detect that host device 104 is a pair of sunglasses, as discussed above, and that a second peripheral device PD is connected to the system (a vehicle computer capable of establishing a Bluetooth connection) the audio data may be passed from the first peripheral device to the host device 104 or the open-ear acoustic module 102 and then to the second peripheral device, i.e., from the smart phone to the host device or the open-ear acoustic device to the vehicle for generation of acoustic energy AE via the vehicle's audio system. As an alternative, audio system 100 can be configured to pass audio data as discussed above based on engagement with host device 104 rather than proximity to host device 104.

Figure 7:
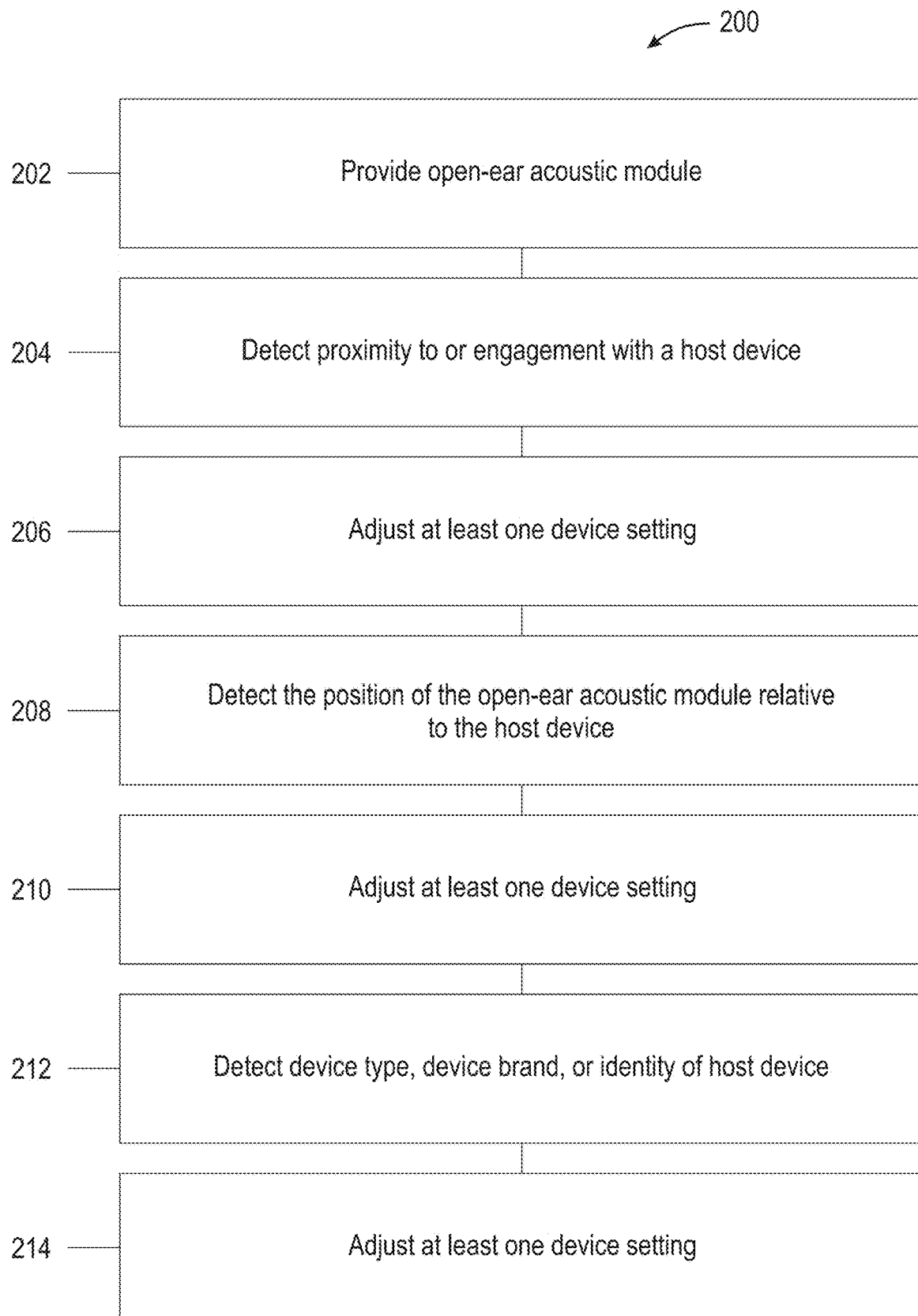
FIG. 7 is a flow chart illustrating the steps of a method according to the present disclosure.

FIG. 7 is a flow chart illustrating exemplary steps of method 200 according to the present disclosure. Method 200 includes, for example, providing the removable open-ear acoustic module 102 wherein the removable open-ear acoustic module 102 is configured to generate acoustic energy AE outside of and proximate to a user's ear and configured to removably engage with a host device 104 (step 202); detecting that the removable open-ear acoustic module 102 is in proximity to the host device 104 or engaged with the host device 104 (step 204); adjusting at least one device setting 170 based at least in part on detecting that the removable open-ear acoustic module 102 is in proximity to the host device 104 or engaged with the host device 104 (step 206). Additionally, method 200 may include as an alternative or in addition to the steps recited above, detecting a position P or location of the removable open-ear acoustic module 102 relative to the host device 104 (step 208); and, adjusting the at least one device setting 170 based at least in part on the position P or location of the removable open-ear acoustic module 102 relative to the host device 104 (step 210). Similarly, method 200 may also include as an alternative to in addition to the steps described above detecting a device type 174 associated with the host device, a device brand 176 associated with the host device, or an identity 172 172 of a manufacturer of the host device (step 212); and, adjusting the at least one device setting 170 based at least in part on the detected type, the detected brand, or the detected identity 172 of the manufacturer of the host device 104 (step 214).

Figure 8:
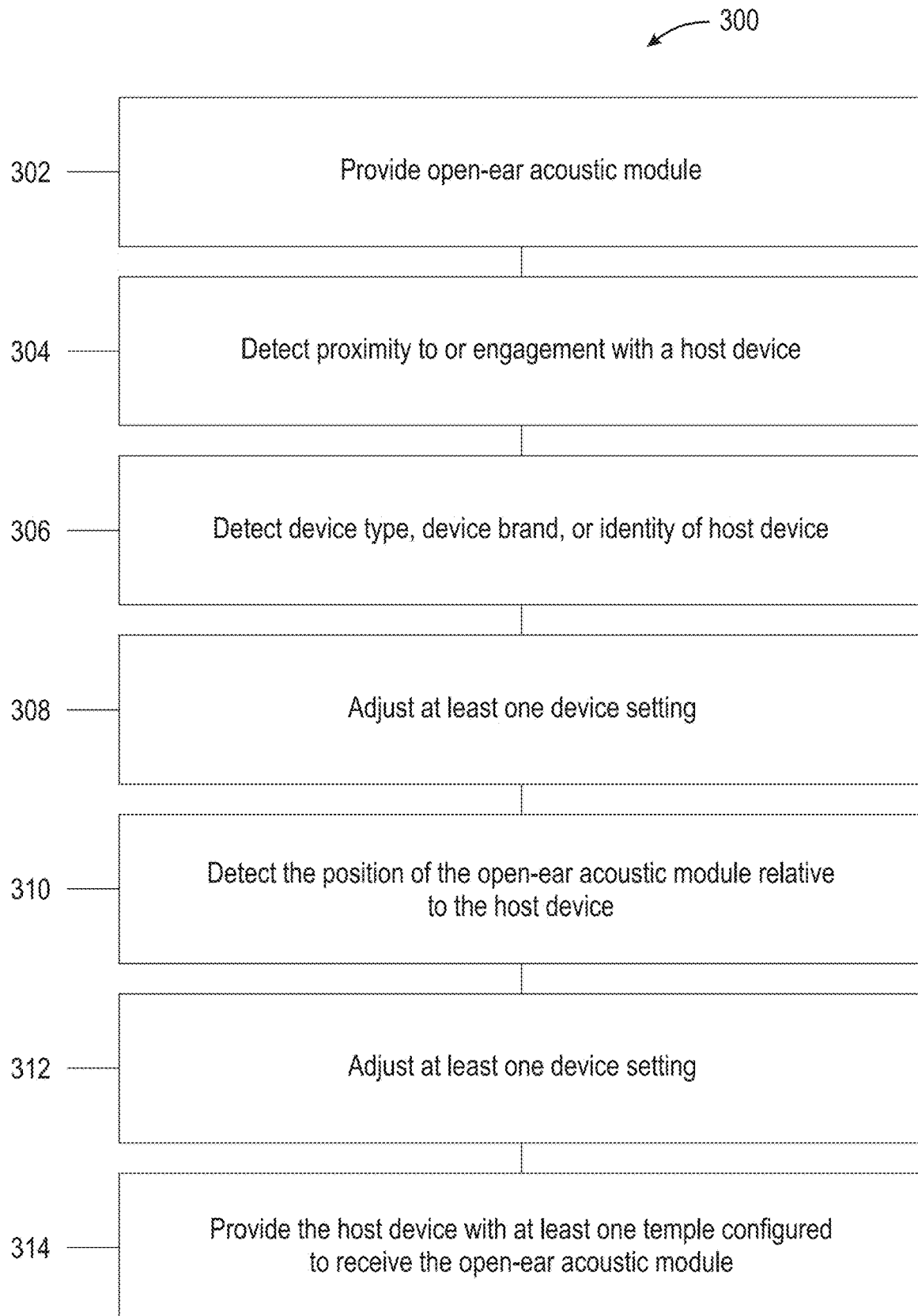
FIG. 8 is a flow chart illustrating the steps of a method according to the present disclosure.

FIG. 8 is a flow chart illustrating exemplary steps of method 300 according to the present disclosure. Method 300 includes, for example, providing the removable open-ear acoustic module 102 wherein the removable open-ear acoustic module 102 is configured to generate acoustic energy AE outside of and proximate to a user's ear and configured to removably engage with the host device 104 (step 302); detecting that the removable open-ear acoustic module 102 is in proximity to the host device 104 or engaged with the host device 104 (step 304); detecting a device type 174 associated with the host device 104, a device brand 176 associated with the host device 104, or an identity 172 of a manufacturer of the host device 104 (step 306); and, adjusting at least one device setting 170 based at least in part on the detected type 174, the detected brand 176, or the detected identity 172 of a manufacturer of the host device 104 (step 308). In addition to or in the alternative to the steps recited above, method 300 also includes obtaining a position P or location of the removable open-ear acoustic module 102 relative to the host device 104 associated with the detected type 174, the detected brand 176, or the detected identity 172 of a manufacturer of the host device 104 (step 310); and, adjusting the at least one device setting 170 based at least in part on the position P or location of the removable open-ear acoustic module 102 relative to the host device 104 (312). In one example, method 300 further includes providing the host device 104, wherein the host device 104 comprises a body having a pair of temples 106, wherein at least one of the temples is configured to removably engage with the removable open-ear acoustic module 102 such that, when engaged, the removable open-ear acoustic module 102 is configured to generate acoustic energy AE outside of and proximate to a user's ear (step 314).

Figure 9:
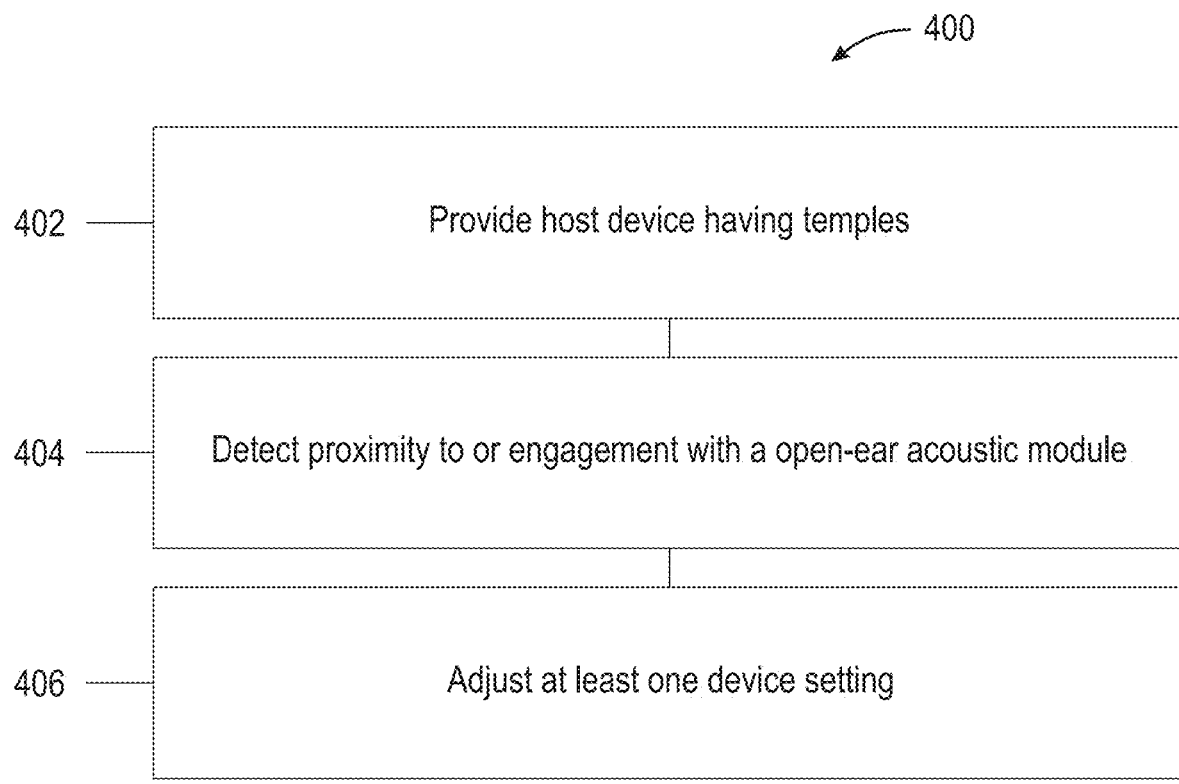
FIG. 9 is a flow chart illustrating the steps of a method according to the present disclosure.

FIG. 9 is a flow chart illustrating exemplary steps of method 400 according to the present disclosure. Method 400 includes, for example, providing a host device, wherein the host device comprises a body having a pair of temples, wherein at least one of the temples is configured to removably engage with the removable open-ear acoustic module such that, when engaged, the removable open-ear acoustic module is configured to generate acoustic energy outside of and proximate to a user's ear (step 402); detecting that the removable open-ear acoustic module is in proximity to the host device or engaged with the host device (step 404); and, adjusting at least one device setting based at least in part on detecting that the removable open-ear acoustic module is in proximity to the host device or engaged with the host device (step 406).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for detecting a host device using a removable open-ear acoustic module, the method comprising:
    providing the removable open-ear acoustic module wherein the removable open-ear acoustic module is configured to generate acoustic energy outside of and proximate to a user's ear and configured to removably engage with a host device;
    detecting that the removable open-ear acoustic module is in proximity to the host device by detecting a magnetic field above a minimum threshold;
    adjusting at least one device setting based at least in part on detecting that the removable open-ear acoustic module is in proximity to the host device;
    detecting that the removable open-ear acoustic module is engaged with the host device by detecting a magnetic field above another threshold that is above the minimum threshold; and
    adjusting the at least one device setting or another device setting based at least in part on detecting that the removable open-ear acoustic module is engaged with the host device.

2. The method of claim 1, wherein the at least one device setting is associated with the host device, the removable open-ear acoustic module, or a peripheral device in communication with the host device or the removable open-ear acoustic module.

3. The method of claim 1, wherein the at least one device setting is selected from: a power state of the open-ear acoustic module; an audio equalization (EQ) setting, a volume setting, a bass level setting, a treble level setting, an Active Noise Reduction (ANR) setting, a user profile setting, selection of an algorithm of a plurality of algorithms related to data collection, a sensor calibration setting, and a user interface control setting.

4. The method of claim 1, wherein detecting that the removable open-ear acoustic module is in proximity to the host device further comprises at least one of: detection of the host device or the removable open-ear acoustic module via a Radio Frequency Identification (RFID) communication or Near-Field Communication (NFC); detection of proximity via a proximity sensor; detection of time-of-flight of a sound wave or a light wave; or, detection of proximity via a visual indicator.

5. The method of claim 4, wherein the visual indicator is selected from: a Quick Response (QR) code, a barcode, or a colored portion of either the host device or the removable open-ear acoustic module.

6. The method of claim 1, wherein the host device is selected from: a pair of eyeglass frames, a pair of sunglass frames, a helmet, a visor, a hat, a headband, a pair of goggles, a charging case, a portable speaker housing, or a behind-the-ear module housing.

7. The method of claim 1 further comprising:
detecting a position or location of the removable open-ear acoustic module relative to the host device; and,
adjusting the at least one device setting based at least in part on the position or location of the removable open-ear acoustic module relative to the host device.

8. The method of claim 1 further comprising:
detecting a device type associated with the host device, a device brand associated with the host device, or an identity of a manufacturer of the host device; and,
adjusting the at least one device setting based at least in part on the detected type, the detected brand, or the detected identity of the manufacturer of the host device.

9. A method for detecting a host device using a removable open-ear acoustic module, the method comprising: providing the removable open-ear acoustic module wherein the removable open-ear acoustic module is configured to generate acoustic energy outside of and proximate to a user's ear and configured to removably engage with the host device; detecting that the removable open-ear acoustic module is in proximity to the host device by detecting a magnetic field above a minimum threshold; detecting a device type associated with the host device, a device brand associated with the host device, or an identity of a manufacturer of the host device; adjusting at least one device setting based at least in part on the detected type, the detected brand, or the detected identity of a manufacturer of the host device, detecting that the removable open-ear acoustic module is engaged with the host device by detecting a magnetic field above another threshold that is above the minimum threshold; and adjusting the at least one device setting or another device setting based at least in part on detecting that the removable open-ear acoustic module is engaged with the host device.

10. The method of claim 9, wherein the at least one device setting is associated with the host device, the removable open-ear acoustic module, or a peripheral device in communication with the host device or the removable open-ear acoustic module.

11. The method of claim 9, wherein the at least one device setting is selected from: a power state of the open-ear acoustic module; an audio equalization (EQ) setting, a volume setting, a bass level setting, a treble level setting, an Active Noise Reduction (ANR) setting, a user profile setting, selection of an algorithm of a plurality of algorithms related to data collection, a sensor calibration setting, and a user interface control setting.

12. The method of claim 9, wherein detecting that the removable open-ear acoustic module is in proximity to the host device further comprises at least one of: detection of the host device or the removable open-ear acoustic module via a Radio Frequency Identification (RFID) communication or Near-Field Communication (NFC); detection of proximity via a proximity sensor; detection of time-of-flight of a sound wave or a light wave; or, detection of proximity via a visual indicator.

13. The method of claim 12, wherein the visual indicator is selected from: a Quick Response (QR) code, a barcode, or a colored portion of either the host device or the removable open-ear acoustic module.

14. The method of claim 9, wherein the host device is selected from: a pair of eyeglass frames, a pair of sunglass frames, a helmet, a visor, a hat, a headband, a pair of goggles, a charging case, a portable speaker housing, or a behind-the-ear module housing.

15. The method of claim 9 further comprising: obtaining a position or location of the removable open-ear acoustic module relative to the host device associated with the detected type, the detected brand, or the detected identity of a manufacturer of the host device; and, adjusting the at least one device setting based at least in part on the position or location of the removable open-ear acoustic module relative to the host device.

16. A method for detecting a removable open-ear acoustic module, the method comprising:
providing a host device, wherein the host device comprises a body having a pair of temples, wherein at least one of the temples is configured to removably engage with the removable open-ear acoustic module such that, when engaged, the removable open-ear acoustic module is configured to generate acoustic energy outside of and proximate to a user's ear;
detecting that the removable open-ear acoustic module is in proximity to the host device by detecting a magnetic field above a minimum threshold;
adjusting at least one device setting based at least in part on detecting that the removable open-ear acoustic module is in proximity to the host device;
detecting that the removable open-ear acoustic module is engaged with the host device by detecting a magnetic field above another threshold that is above the minimum threshold; and
adjusting the at least one device setting or another device setting based at least in part on detecting that the removable open-ear acoustic module is engaged with the host device.

17. The method of claim 16 wherein the at least one device setting is associated with the host device, the removable open-ear acoustic module, or a peripheral device in communication with the host device or the removable open-ear acoustic module.

18. The method of claim 16, wherein detecting that the removable open-ear acoustic module is in proximity to the host device further comprises at least one of: detection of the host device or the removable open-ear acoustic module via a Radio Frequency Identification (RFID) communication or Near-Field Communication (NFC); detection of proximity via a proximity sensor; detection of time-of-flight of a sound wave or a light wave; or, detection of proximity via a visual indicator.

19. A method for detecting a host device using a removable open-ear acoustic module, the method comprising:
providing the removable open-ear acoustic module wherein the removable open-ear acoustic module is configured to generate acoustic energy outside of and proximate to a user's ear and configured to removably engage with a host device;
detecting that the removable open-ear acoustic module is in proximity to the host device by a visual sensor arranged in the removable open-ear acoustic module or the host device, wherein the visual sensor is configured to capture an image or image data of a visual indicator on the removable open-ear acoustic module or the host device, wherein the image or image data of the visual indicator indicates proximity and the visual indicator is selected from a Quick Response (QR) code, a barcode, or a colored portion of either the host device of the removable open-ear acoustic module;

detecting that the removable open-ear acoustic module is in proximity to the host device by detecting a magnetic field above a minimum threshold;

adjusting at least one device setting based at least in part on detecting that the removable open-ear acoustic module is in proximity to the host device;

detecting that the removable open-ear acoustic module is engaged with the host device by detecting a magnetic field above another threshold that is above the minimum threshold; and adjusting the at least one device setting or another device setting based at least in part on detecting that the removable open-ear acoustic module is engaged with the host device.

* * * * *